(12) United States Patent
Hengstler et al.

(10) Patent No.: US 12,163,852 B2
(45) Date of Patent: Dec. 10, 2024

(54) AUTARKIC MEASURING DEVICE WITH ON-SITE DISPLAY UNIT

(71) Applicant: VEGA GRIESHABER KG, Wolfach (DE)

(72) Inventors: Clemens Hengstler, Haslach (DE); Stefan Kaspar, Hofstetten (DE)

(73) Assignee: VEGA GRIESHABER KG, Wolfach (DE)

( * ) Notice: Subject to any disclaimer, the term of this patent is extended or adjusted under 35 U.S.C. 154(b) by 371 days.

(21) Appl. No.: 17/680,867

(22) Filed: Feb. 25, 2022

(65) Prior Publication Data

US 2022/0276111 A1 Sep. 1, 2022

(30) Foreign Application Priority Data

Mar. 1, 2021 (DE) .................. 10 2021 201 926.9

(51) Int. Cl.
*G01L 27/00* (2006.01)
*G01F 25/20* (2022.01)
*G01L 9/00* (2006.01)

(52) U.S. Cl.
CPC ............ *G01L 27/007* (2013.01); *G01F 25/20* (2022.01); *G01L 9/00* (2013.01)

(58) Field of Classification Search
CPC ........... G01F 25/20; G01F 25/22; G01F 25/24
See application file for complete search history.

(56) References Cited

U.S. PATENT DOCUMENTS

| 5,777,550 A * | 7/1998 | Maltby ................. G08B 29/14 340/508 |
| 2007/0261487 A1* | 11/2007 | Sintes ................. G01F 23/2962 73/290 V |
| 2016/0153813 A1* | 6/2016 | Skaug ..................... G01F 23/00 702/187 |
| 2018/0340813 A1* | 11/2018 | Cowles ................. F17C 13/023 |

FOREIGN PATENT DOCUMENTS

| AT | 17018 U1 | 2/2021 |
| DE | 10 2018 132 277 A1 | 6/2020 |
| WO | WO 2021/083571 A1 | 5/2021 |

OTHER PUBLICATIONS

German Office Action issued Oct. 6, 2021 in German Patent Application No. 10 2021 201 926.9, 6 pages.

* cited by examiner

*Primary Examiner* — Herbert K Roberts
(74) *Attorney, Agent, or Firm* — Oblon, McClelland, Maier & Neustadt, L.L.P.

(57) ABSTRACT

A self-sufficient measuring device, for level, limit level or pressure measurement of a process vessel over a longer period of time, which has sensor and evaluation circuitry configured to determine a first measured value and/or a first diagnostic value, and a display device, which has switching circuitry and is configured to display the first measured value and/or the first diagnostic value of the sensor and evaluation circuitry. The switching circuitry is arranged to locally activate the display of the first measured value and/or the first diagnostic value on the display device.

12 Claims, 2 Drawing Sheets

AUTARKIC MEASURING DEVICE WITH ON-SITE DISPLAY UNIT

CROSS-REFERENCE TO RELATED APPLICATIONS

This application claims the benefit of the filing date of German Patent Application No. 10 2021 201 926.9 filed on 1 Mar. 2021, the entire content of which is incorporated herein by reference.

FIELD

The disclosure relates to an autarkic, self-sufficient measuring device for level, limit level or pressure measurement of a process vessel over a longer period of time, a display device with a switching unit for a self-sufficient measuring device for on-site display of a level, limit level or pressure measurement of a process vessel, the use of a self-sufficient measuring device for level, level or pressure measurement with a display device for on-site inventory control of a process vessel, the use of a display device for on-site display of a level, limit level or pressure measurement of a process vessel by way of a self-sufficient measuring device, a method for level, limit level or pressure measurement of a process vessel by way of a self-sufficient measuring device, a program element and a computer-readable medium.

BACKGROUND

Measurement sensors are used in modern measurement technology to detect a target object and/or determine specific measurement data, for example for level or limit measurement in a process plant. The measurement data is typically displayed directly on a display in the plant or via a cloud system on one or more mobile devices, such as a smartphone or tablet, and continuously monitored.

SUMMARY

It is an object of the present disclosure to specify an alternative measuring arrangement which enables the energy-saving inventory control of a process plant.

This object is solved by the features of the independent patent claim. Further embodiments result from the dependent patent claims and the following description of embodiments.

A first aspect of the present disclosure relates to an autarkic or non-autarkic measuring device for level, limit level or pressure measurement of a process vessel over a longer period of time, which comprises a sensor and evaluation unit (circuitry) and a display device. The sensor and evaluation unit is configured to determine a first measured value and/or a first diagnostic value. The display device has a switching unit (circuitry) and is configured to display the first measured value and/or the first diagnostic value of the sensor and evaluation unit. The switching unit is configured to activate the display of the first measured value and/or the first diagnostic value on the display device on site.

The process vessel can be an IBC container, for example.

The measuring device can, for example, be a level, limit level or pressure measuring device. Accordingly, the first measured value can be, for example, a filling level and the first diagnostic value, which can be evaluated on the basis of the filling level, can be, for example, a degree of occupancy or filling of the process vessel.

The measuring device can be provided above a filling material in the process vessel and on the process vessel. For example, the self-contained measuring device can be arranged at an opening of the process vessel. Alternatively, the measuring device may be arranged outside the process vessel and the measuring signal of the self-sufficient measuring device may be emitted through the vessel wall for acquiring the measured data or the first measured value.

"On-site display" means that the first measured value and/or the first diagnostic value can be displayed or visualized at the process vessel, in the immediate vicinity of the vessel, or directly in the same premises where the vessel may be located. Only when a user or an operator can be in the premises of the process vessel or the measuring device, the measurement data or the diagnostic data can be visible and readable by the user.

Since the measuring device can be a self-sufficient, i.e., autarkic measuring device, the self-sufficient measuring device does not have a wired energy supply, but an internal energy supply, such as a battery, an accumulator, a battery, an energy harvesting system or a solar cell. Thus, wireless communication, for example by radio or by way of Bluetooth, NB-lot, LTE CAT M, W-Lan, etc., can take place between the autonomous measurement sensor or the sensor and evaluation unit and the display device and/or a cloud system, an edge device or a controller. Compared to wired communication, where the energy required for measurement should always be in use, battery-powered sensors for monitoring level, point level or pressure values may become increasingly important with the availability of more advanced, energy-saving wireless technologies. Particular advantages arise for applications in the field of process automation in industrial or private environments such as logistics.

The term "process automation in industrial or private environments" can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subarea of process automation in the industrial environment concerns logistics automation. With the help of distance and angle sensors, processes within a building or within an individual logistics facility are automated in the field of logistics automation. Typical applications are e.g., systems for logistics automation in the field of baggage and freight handling at airports, in the field of traffic monitoring (toll systems), in retail, parcel distribution or also in the field of building security (access control). What is meant by the examples listed above is that presence detection in combination with precise measurement of the size and location of an object is required by the respective application side. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

For example, the continuous, automated monitoring of fill levels in mobile containers and the wireless transmission of the values to a central evaluation point in the area of goods logistics can be used to implement cross-location inventory management in a simple manner. Using the recorded data, significant cost reductions can be achieved depending on the particular problem, for example if the route for delivery vehicles to supply replenishments can be optimized.

The autarkic measuring device may further comprise a timer, a logic circuit arranged between the timer and the evaluation unit, and a switching element arranged to connect the power supply, the logic circuit and the evaluation unit. Furthermore, it may be provided that an evaluation unit or a processor may set up a latch signal for activating the power supply.

It can be provided that the sensor and evaluation unit can have a sensor unit and an evaluation unit, which are provided separately from each other and are electrically connected to each other. Furthermore, the sensor and evaluation unit can have electronics that are configured to electrically connect the sensor unit, the evaluation unit and the display device. Alternatively, the electronics may be integrated in the evaluation unit.

The self-sufficient measuring device may further comprise a housing in which the evaluation unit and/or the electronics of the self-sufficient measuring device may be provided. It may be provided that the sensor unit, which may be an antenna, for example, may be arranged on the housing of the self-sufficient measuring device on a different side than the display device. That is, the display device with the switching unit may be arranged either on the opposite side of the housing or on the wall of the housing. Alternatively, the display device with the switching unit may be arranged outside the housing.

The display device may be implemented as an on-site display or a display. For example, the display device may be an LCD, an LED, an OLED, a matrix display, an e-paper, or a display of another display technology.

According to a further embodiment, the display device is arranged to display the first measured value and/or the first diagnostic value with a first time information associated with the first measured value and/or diagnostic value.

In addition, the display device or display may have its own small processor and real-time clock.

With the time information, it can be read from the display device, for example, when the displayed first measured value and/or the displayed first diagnostic value were determined.

The time information can be, for example, absolute with the date or an actual date and time of the last measurement, or relative with a predetermined period of time, or a cyclically updated indication since which the displayed measured value was determined. It can also be provided that the time information can be updated in an energy-saving manner at increasingly larger time intervals (e.g., initially 1×per min, then every 2 min, 5 min, 15 min, 30 min, 1 h, 2 h, 4 h, 8 h, 16 h, 1 day or logarithmically increasing).

Since the measuring interval of the autarkic measuring device can typically be very long, e.g., for 15 min to 1 day, the first measured value or the first diagnostic value can already be outdated again, depending on how long its determination has passed. Therefore, it may be important that the display device can be set up by way of the switching unit to display the last determined measured value and/or diagnostic value with the corresponding time information. The time information of the measured value acquisition can also be used to assess on site whether the measured value and/or diagnostic value determined at that time is still meaningful in the respective process at the time of reading. If the measured value determination is so long in the past that the measured value could already be outdated in the meantime, it can be advantageous to activate a new acquisition and display of the current measured value or diagnostic value before further actions can be initiated.

According to a further embodiment, the switching unit is connected to the display device and the sensor and evaluation unit.

It can be provided that the autarkic measuring device is configured in such a way that the display device and the sensor and evaluation unit are provided separately in terms of circuitry. For this purpose, the switching unit can be configured to activate or trigger either the entire electronics of the autarkic measuring device or, in an energy-saving manner, only the display device by way of a part of the entire electronics, for example when displaying a display content such as a time stamp.

According to a further embodiment, the sensor and evaluation unit is configured to calculate the first diagnostic value based on the first measured value and to transmit the first diagnostic value to the display device.

According to a further embodiment, the display device is configured to display a second measured value and/or a second diagnostic value of the sensor and evaluation unit.

In addition, the switching unit of the display device can further be configured to activate, depending on the first measured value and/or the first diagnostic value and/or the first time information, the determination of the second measured value and/or the second diagnostic value by way of the sensor and evaluation unit and the display of the second measured value and/or the second diagnostic value on the display device on site.

Alternatively or additionally, the switching unit of the display device can be configured to activate the determination of the second measured value and/or the second diagnostic value and the display of the second measured value and/or the second diagnostic value on site in the event of an error message or a malfunction of the autarkic measuring device in the process plant or in the event of an action, such as refilling or removal.

According to a further embodiment, the display device is configured to display a third measured value and/or a third diagnostic value of the sensor and evaluation unit. The switching unit of the display device is also configured to activate the determination of the third measured value and/or the third diagnostic value by way of the sensor and evaluation unit and the display of the third measured value on the display device on site after filling or emptying of the process vessel.

By way of the display device, which can be configured as an on-site display for on-site activation of the data acquisition and display of the measured and diagnostic values and for displaying the time information, the autarkic measuring device can advantageously enable the user or the operator to initiate appropriate actions simply and quickly after estimating the actuality of the measured value without additional aids. For example, during a level measurement of a process vessel, the operator can remove or refill an amount of filling material.

According to a further embodiment, the switching unit comprises a first actuating device, which is configured to activate the display of the first measured value and/or the diagnostic value on the display device on site by actuating the first actuating device.

According to a further embodiment, the switching unit further comprises a second actuating device, which is arranged at a distance from the first actuating device, is connected to the sensor and evaluation unit and is configured to activate, by actuating the second actuating device, the determination of the second measured value and/or the second diagnostic value by way of the sensor unit and the on-site display of the second measured value and/or the diagnostic value on the display device.

By way of the first or second actuating devices, the self-sufficient measuring device with the sensor and evaluation unit and the display device can only be activated when the first and second actuating devices are actuated. This can advantageously save the energy for operating the display device, which can be of great importance for the self-sufficient measuring device and a longer operating time can be made possible thereby.

According to one embodiment, the switching unit has a single actuating device, which is configured to activate the display of the first measured value on the on-site display device by actuating the actuating device, or to activate the determination of the second measured value and/or the second diagnostic value by way of the sensor and evaluation unit and the display of the second measured value and/or the diagnostic value on the on-site display device by further actuation for a longer predefined period of time or double actuation of the actuating device.

The switching unit can be, for example, a pushbutton, which is, for example, a push button switch, a toggle switch, capacitive switch or the like, or a reed contact or a Hall sensor that can be actuated by way of magnets, or an NFC contact. It may be provided that the time information can be updated only when the push button is actuated.

Alternatively, the switching unit may be arranged to initiate or trigger measurement or display by way of the self-contained measuring device, for example, when the actuating device is pressed or touched, if, according to the time information on the display device, the period of time since the first measured value or the first diagnostic value was last determined is considered to be too long.

By activating the measurement data acquisition and the display of the determined first and/or second measured values or diagnostic values, the autarkic measuring device can advantageously be operated in an energy-saving manner, since the actuating device of the display device can additionally or only be used to trigger a renewed measurement value determination and the display of the measured values or diagnostic values if the displayed measured value is considered to be outdated. An advantage may be that, for example, an inventory check of the process vessel can be carried out quickly and flexibly on site without an external aid, such as a portable display, so that there is no need to wait a long time for the next measured value. In addition, this activity can thus be transferred to third parties easily and cost-effectively since no additional aids are required. Thus, the measuring interval of the autarkic measuring device can be shortened and the autarkic operation of the measuring device can be extended.

The autarkic measuring device can be used, for example, in the process industry, factory automation or logistics automation, but also increasingly in the consumer sector, e.g., for measuring the level in the domestic rainwater cistern "smart home"). Often, the autarkic measuring device is accessible to an operator or to maintenance personnel, who, however, cannot read the current measured value or a possible pending error status without further aids due to the often missing on-site display for cost and energy saving reasons. For example, if it is a process vessel that is to be filled or emptied by the operating personnel on the basis of the level reading of the autarkic measuring device, such an on-site display may be necessary, especially if the operating personnel change frequently or come from an external company and additional aids, such as a smartphone, for reading the level would thus be very obstructive.

Another aspect relates to a display device comprising a switching unit for an autarkic, i.e., self-sufficient measuring device for on-site display of a level, limit level or pressure measurement of a process vessel.

Another aspect relates to the use of a self-sufficient measuring device for level, limit level or pressure measurement with a display device for on-site inventory control of a process vessel.

By way of the self-sufficient measuring device with the display device as the on-site display, a possibility can be opened for the inventory control to be able to carry out a diagnosis, if necessary, a fault rectification or a predictive maintenance, e.g., within the scope of a plant tour, simply and quickly on site without further aids. In addition, a reaction to the displayed measured value or diagnostic value can be made on site without additional aids. For example, the autarkic measuring device can be configured to determine how much filling material can still be removed from a container by displaying the filling level through the repetitive measured value acquisition and re-displaying the measured value or diagnostic value. Without such additional aids, the activities can also be carried out very easily and cost-effectively by third parties, such as external logistics service providers.

The use of the autarkic measuring device with the display device or the on-site display can thus advantageously lead to automated inventory control and also to optimized subsequent delivery management ("Inventory Management"). Also the changes in the process, such as increased vibrations, which can be caused by imminent bearing damage, can be detected at an early stage for "Predictive Maintenance".

Another aspect relates to use of a display device for on-site display of a level, limit level or pressure measurement of a process vessel by way of a self-contained measuring device.

By way of the display device, which can be configured as an on-site display for on-site activation of the data acquisition and display of the measured and diagnostic values and for displaying the time information, the autarkic measuring device can advantageously enable the user or operator to derive appropriate actions simply after estimating the actuality of the measured value without additional aids. For example, the operator can remove or refill an amount of filling material during a level measurement of a process vessel.

Another aspect relates to a method for level, limit level or pressure measurement of a process vessel by way of a self-contained measuring device. The method comprises the steps of: Acquisition of a first measured value and/or a first diagnostic value by way of a sensor and evaluation unit and on-site activation of the display of the first measured value and/or the first diagnostic value of the sensor and evaluation unit on a display device by way of a switching unit.

According to one embodiment, the method further comprises the steps of: locally activating the determination of a second measured value and/or a second diagnostic value by way of sensor and evaluation unit, and locally activating the display of the second measured value and/or the second diagnostic value of the sensor and evaluation unit on the display device by way of the switching unit.

According to one embodiment, the method further comprises the following step of generating and displaying a timestamp at the time of the measurement value determination, or a cyclically repeating time indication of how long ago the last measurement value determination was made.

Another aspect relates to a program element that, when executed on a processor of a self-contained meter, instructs the self-contained meter to perform the steps of the method described above.

Another aspect relates to a computer-readable medium on which a program element is stored.

In the following, embodiments of the present disclosure are described with reference to the figures. If the same reference signs are used in the figure description, these describe the same or similar elements. The illustrations in the figures are schematic and not to scale.

DETAILED DESCRIPTION OF EMBODIMENTS

Figure 1:
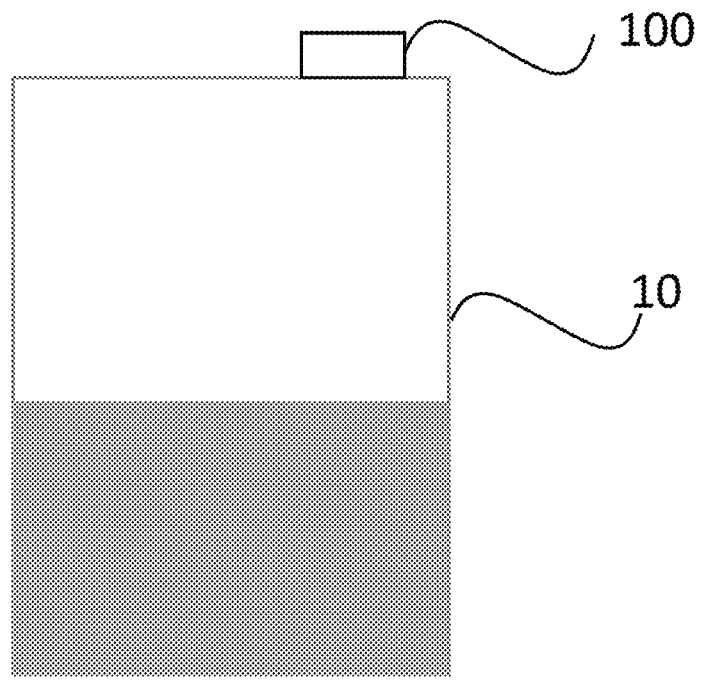
FIG. 1 schematically shows a process vessel with a self-sufficient measuring device according to one embodiment.

FIG. 1 schematically shows a process vessel 10 with a self-sufficient measuring device 100, which is mounted above the filling material in the process vessel 10 on the outside of the vessel 10, for example for level or point level measurement. Alternatively, the self-sufficient measuring device 100 can be arranged at an opening of the process vessel, for example for level, limit level or pressure measurement, or laterally on the outside of the vessel wall.

Figure 2:
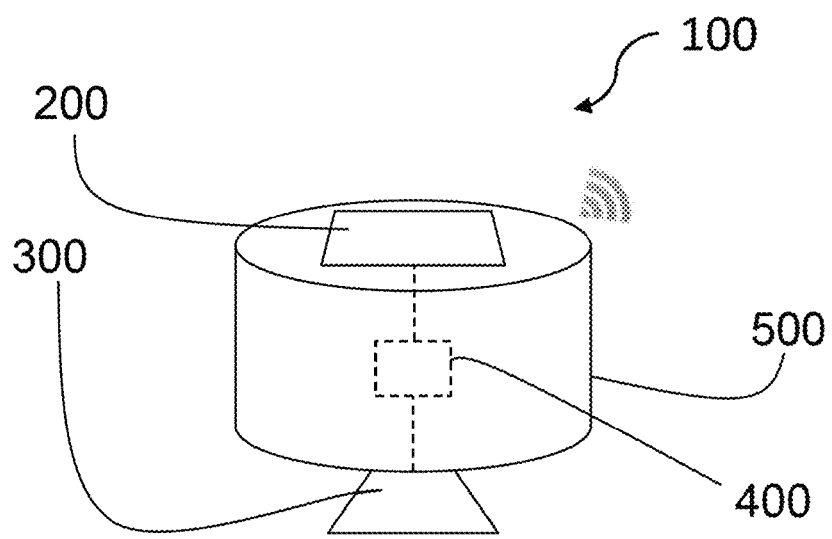
FIG. 2 schematically shows an autarkic measuring device according to one embodiment.

FIG. 2 schematically shows the self-sufficient measuring device 100 for level, limit level or pressure measurement of the process vessel over a longer period of time, which has a sensor and evaluation unit 300, 400, a display device 200 and a sensor housing 500. The electronics of the self-sufficient measuring device 100 are arranged in the housing and the display device 200, for example as a display, is provided on the outside of the housing.

The sensor and evaluation unit 300, 400 is configured to determine a first measured value and/or a first diagnostic value. The sensor and evaluation unit may comprise a sensor unit 300 and an evaluation unit 400, which may be provided separately from each other and may be electrically connected to each other. Furthermore, the evaluation unit 400 of the sensor and evaluation unit 300, 400 may be arranged in the housing 500, while the sensor unit 300 of the sensor and evaluation unit 300, 400 may be arranged outside the housing or on the housing.

The sensor and evaluation unit 300, 400 can be configured to display the first measured value and/or the first diagnostic value of the sensor and evaluation unit 300, 400. It can be provided that the sensor and evaluation unit 300, 400 can be configured to detect the first measured value by way of the sensor unit 300 and to calculate the first diagnostic value by way of the evaluation unit 400 on the basis of the first measured value. The sensor and evaluation unit 300, 400 can further be configured to transmit the first measured value and/or the diagnostic value to the display device 200.

The version without a pushbutton can also be configured so that time information (time of measured value determination or cyclically updating the time that has passed since the last measured value determination) is shown on the display.

Figure 3:
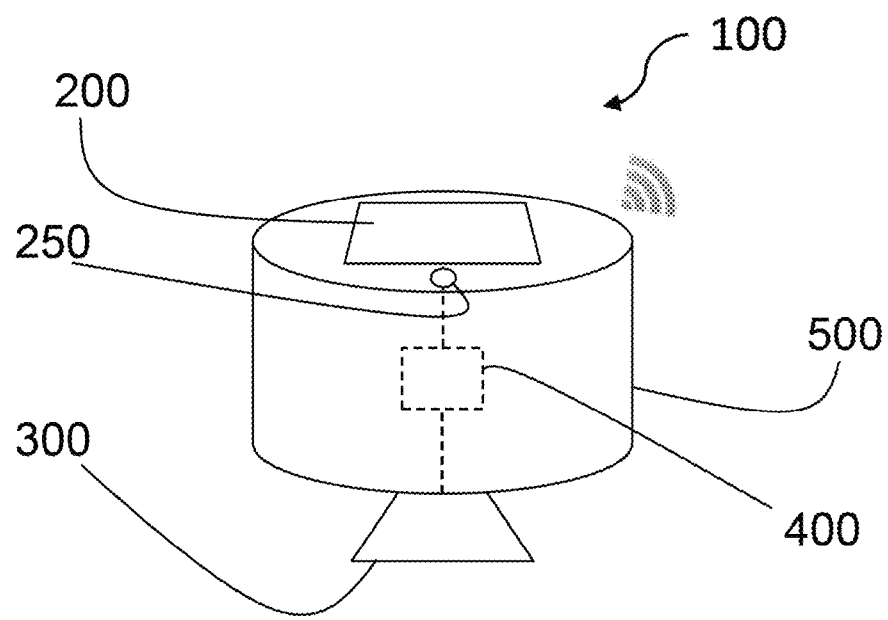
FIG. 3 schematically shows an autarkic measuring device according to a further embodiment.

FIG. 3 shows that the display device may comprise a switching unit 250, which may be arranged to display the first measured value and/or the first diagnostic value with a first time information associated with the first measured value and/or diagnostic value. The switching unit 250 may be arranged to locally activate the display of the first measured value and/or the first diagnostic value on the display device 200.

The time information can, for example, be represented absolutely with the date or an actual date and time of the last measurement or relatively with a predefined period of time or a cyclically updated indication since which the displayed measured value has been determined. Furthermore, it can be provided that the time information can be updated in an energy-saving manner at increasingly larger time intervals (e.g., initially 1×per min, then every 2 min, 5 min, 15 min, 30 min, 1 h, 2 h, 4 h, 8 h, 16 h, 1 day or logarithmically increasing).

Furthermore, the display device 200 may be arranged to display a second measured value and/or a second diagnostic value of the sensor and evaluation unit 300, 400. Accordingly, the switching unit 250 of the display device 200 can further be configured to activate, depending on the first measured value and/or the first diagnostic value and/or the first time information, the determination of the second measured value and/or the second diagnostic value by way of the sensor and evaluation unit 300, 400 and the display of the second measured value on the display device 200 on site.

In FIG. 3 for example, the switching unit 250 can have a single actuating device, which can be arranged on the housing 500 of the autarkic measuring device 100 and can be configured to activate the display of the first measured value on the display device 200 on site by actuating the actuating device of the switching unit 250, or by a further actuation for a longer predefined period of time, for example for 3-5 s, or by a double actuation of the actuating device the determination of the second measured value and/or the second diagnostic value by way of the sensor and evaluation unit 300, 400 to activate the display of the first measured value and/or the diagnostic value on the on-site display device 200. The switching unit 250 can be electrically connected to the display device 200, the evaluation unit 400 and/or the sensor unit 300 in such a way that the sensor and evaluation unit 300, 400 and/or the display device 200 can be activated simultaneously or independently of each other.

Alternatively, the switching unit 250 may have two actuation devices, namely a first actuation device and a second actuation device, which may be arranged on the housing 500 of the autarkic measuring device 100 at a distance from each other and/or from the display device 200 and may be connected to the sensor and evaluation unit 300, 400. Thus, the switching unit 250 can be arranged to activate the display of the first measured value and/or the diagnostic value on the display device 200 locally by an actuation of the first actuation device and/or to activate the determination of the second measured value and/or the second diagnostic value by way of the sensor and evaluation unit 300, 400 and the display of the second measured value and/or the diagnostic value on the display device 200 locally by an actuation of the second actuation device.

Furthermore, the display device 200 may be arranged to display a third measured value and/or a third diagnostic value of the sensor and evaluation unit 300, 400. The switching unit 250 of the display device 200 can further be configured to activate the determination of the third measured value and/or the third diagnostic value by way of the sensor and evaluation unit 300, 400 and the display of the third measured value on the display device 200 on site after filling or emptying of the process vessel 10.

Figure 4:
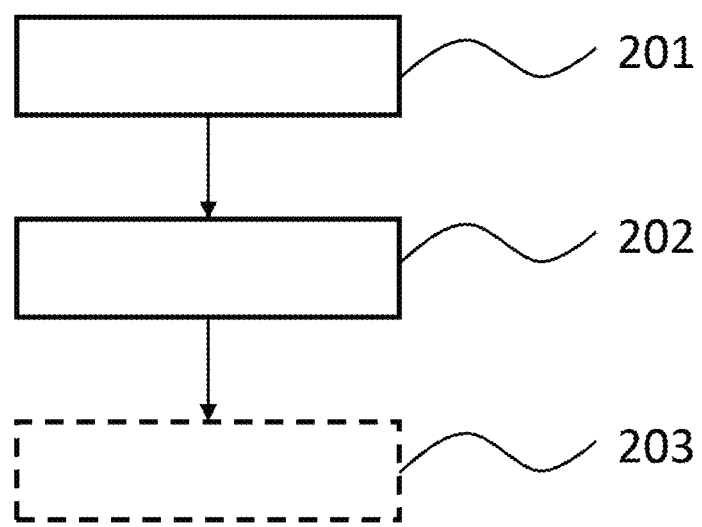
FIG. 4 schematically shows a flow diagram of a method for level, limit level or pressure measurement of a process vessel according to one embodiment.

FIG. 4 schematically shows a flow diagram of a method for level, limit level or pressure measurement of a process vessel 10 by way of an autarkic measuring device 100. In step 201, a first measured value and/or a first diagnostic value is acquired by way of a sensor and evaluation unit. In step 202, the display of the first measured value and/or the first diagnostic value of the sensor and evaluation unit 300, 400 on a display device 200 can be activated locally by way of a switching unit 250.

Furthermore, in step 203, the determination of a second measured value and/or a second diagnostic value can be activated on-site by way of the sensor and evaluation unit 300, 400. Furthermore, the display of the second measured value and/or the second diagnostic way of the sensor and evaluation unit 300, 400 on the display device is activated on-site by way of the switching unit 250.

Supplementally, it should be noted that "comprising" and "having" do not exclude other elements or steps, and the indefinite articles "an" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A measuring device for level, limit level, density or pressure measurement of a process vessel over a period of time, comprising:
sensor and evaluation circuitry configured to determine a first measured value and a first diagnostic value; and
a display device having switching circuitry and configured to display the first measured value and the first diagnostic value of the sensor and evaluation circuitry with first time information associated with the first measured value and diagnostic value,
wherein the switching circuitry is configured to activate the display of the first measured value and the first diagnostic value on-site on the display device,
wherein the measuring device is configured in such a way that the display device and the sensor and evaluation circuitry are provided separately in terms of circuitry,
wherein the display device is further configured to display a second measured value and a second diagnostic value of the sensor and evaluation circuitry, and
wherein the switching circuitry of the display device is further configured to activate, as a function of the first measured value and the first diagnostic value, the determination of the second measured value and the second diagnostic value by way of the sensor and evaluation circuitry and the display of the second measured value and the second diagnostic value on the display device on-site.

2. The measuring device according to claim 1,
wherein the switching circuitry is connected to the display device and the sensor and evaluation circuitry.

3. The measuring device according to claim 1,
wherein the sensor and evaluation circuitry is further configured to calculate the first diagnostic value based on the first measured value and to transmit the first diagnostic value to the display device.

4. The measuring device according to claim 1,
wherein the display device is further configured to display a third measured value and/or a third diagnostic value of the sensor and evaluation circuitry;
wherein the switching circuitry of the display device is further configured to activate the determination of the third measured value and/or the third diagnostic value by way of the sensor and evaluation circuitry and the display of the third measured value on the display device on site after a filling or emptying of the process vessel.

5. The measuring device according to claim 1,
wherein the switching circuitry further comprises a first actuating device, which is configured to activate the display of the first measured value and/or the diagnostic value on the display device locally by an actuation of the first actuating device.

6. The measuring device according to claim 5,
wherein the switching circuitry further comprises a second actuating device which is arranged at a distance from the first actuating device, is connected to the sensor and evaluation circuitry, and is configured to activate the determination of a second measured value and/or the second diagnostic value by way of the sensor and evaluation circuitry and the display of the second measured value and/or the second diagnostic value on the display device on site by actuating the second actuating device.

7. The measuring device according to claim 3,
wherein the switching circuitry further comprises a single actuating device,
wherein the switching circuitry is configured to activate the display of the first measured value on the display device on-site by an actuation of the actuation device, or to activate the determination of a second measured value and/or the second diagnostic value by way of the sensor and evaluation circuitry to display the second measured value and/or the second diagnostic value on the display device on-site by a further actuation for a longer predefined period of time or a double actuation of the actuation device.

8. A display device with the switching circuitry for the measuring device according to claim 1 for on-site display of a level, limit level or pressure measurement of a process vessel.

9. The measuring device according to claim 1,
wherein the switching circuitry further comprises a single actuating device,
wherein the switching circuitry is configured to activate the display of the first measured value on the display device on-site by an actuation of the actuation device, or to activate the determination of the second measured value and/or the second diagnostic value by way of the sensor and evaluation circuitry to display the second measured value and/or the second diagnostic value on the display device on-site by a further actuation for a longer predefined period of time or a double actuation of the actuation device.

10. The measuring device according to claim 4,
wherein the switching circuitry further comprises a single actuating device, and
wherein the switching circuitry is configured to activate the display of the first measured value on the display device on-site by an actuation of the actuation device, or to activate the determination of the third measured value and/or the third diagnostic value by way of the sensor and evaluation circuitry to display the third measured value and/or the third diagnostic value on the display device on-site by a further actuation for a longer predefined period of time or a double actuation of the actuation device.

11. A method for level, limit level or pressure measurement of a process vessel by way of a measuring device, comprising:
acquiring a first measured value and a first diagnostic value by way of sensor and evaluation circuitry; and
activating on-site a display of the first measured value and the first diagnostic value of the sensor and evaluation circuitry on a display device by way of switching circuitry,
wherein the switching circuitry is further configured to activate, as a function of the first measured value and the first diagnostic value, a determination of a second measured value and a second diagnostic value by way of the sensor and evaluation circuitry and the display of the second measured value and the second diagnostic value on the on-site display.

12. A non-transitory computer-readable medium on which is stored a program that when executed by a computer cause the computer to implement a method for level, limit level or pressure measurement of a process vessel by way of a measuring device, the method comprising:
acquiring a first measured value and a first diagnostic value by way of sensor and evaluation circuitry; and
activating on-site a display of the first measured value and the first diagnostic value of the sensor and evaluation circuitry on a display device by way of switching circuitry,
wherein the switching circuitry is further configured to activate, as a function of the first measured value and the first diagnostic value, a determination of a second measured value and a second diagnostic value by way of the sensor and evaluation circuitry and the display of the second measured value and the second diagnostic value on the on-site display.

\* \* \* \* \*